July 11, 1939.   A. G. THOMAS   2,165,663
PLANTING DEVICE
Filed Feb. 4, 1938
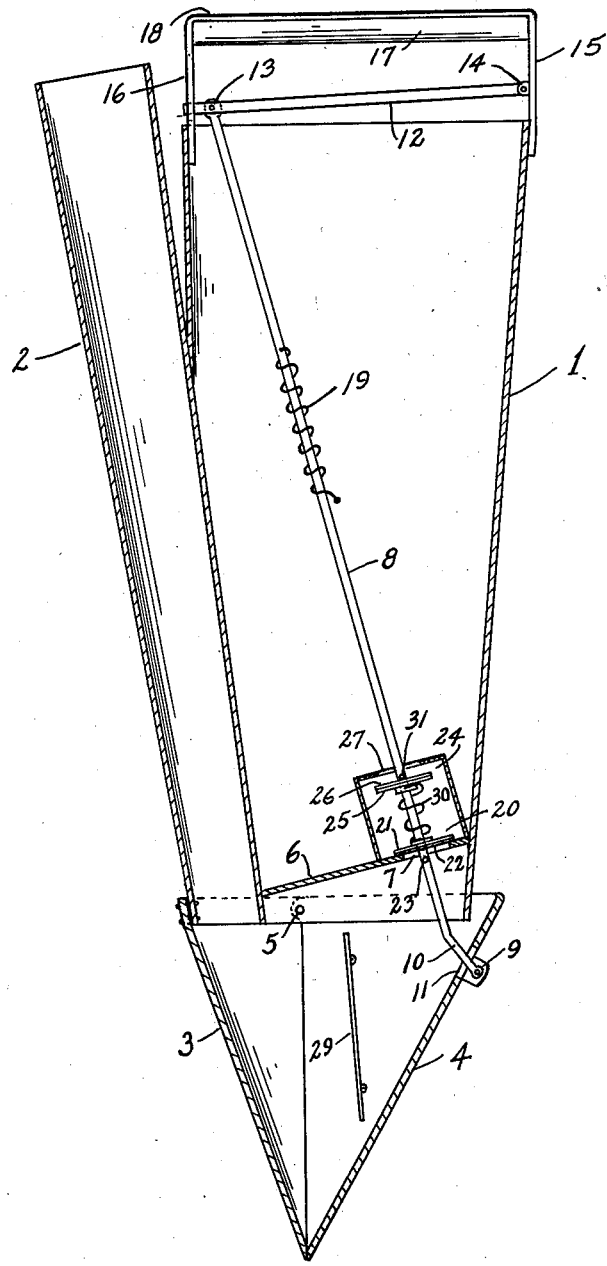
Albert G. Thomas  Inventor Patented July 11, 1939

2,165,663

UNITED STATES PATENT OFFICE 2,165,663

PLANTING DEVICE

Albert G. Thomas, Lynchburg, Va., assignor to Sydnor-Thompson Mfg. Company, Inc., Lynchburg, Va.

Application February 4, 1938, Serial No. 188,597

3 Claims. (Cl. 111—4)

This invention relates to plant setting devices.

An object is to provide a device for setting plants such as tobacco, cabbage, tomatoes, etc., so that the plants may be easily placed in position, watered, and sufficiently covered with earth, with a minimum of effort.

Another object is to provide a plant setter of simple construction so that it can be manufactured cheaply.

In the drawing, which represents a part sectional side elevation, water tank 1 has attached plant tube 2 leading into the space between shovels 3 and 4. Shovel 3 is fixed to the plant tube, or to the water tank or both, and shovel 4 is pivoted to shovel 3 by means of pivot 5 and an opposite pivot not shown. Bottom 6 is soldered into the bottom of tank 1, at an angle, and has opening 7 through which rod 8 passes to be pivoted to lug 9 on shovel 4, by means of bent extension 10 passing through opening 11 in shovel 4. Water guide 29 is fastened to shovel 4.

Rod 8 is pivoted to manual squeeze bar 12 by means of pivot 13 and bar 12 is pivoted at 14 to an ear on vertical handle supporting leg 15 which is fastened to tank 1. Front vertical handle leg 16 is also fastened to tank 1 and has a suitable vertical guide slot through which the front end of bar 12 can travel. Handle 17 is fastened to legs 15 and 16 and to connecting metal strip 18.

Tension spring 19 is fastened to rod 8 and to tank 1 and tends to pull rod 8 in downward direction to keep pivoted shovel 4 pressed tightly against fixed shovel 3 and also to keep valve 20 tightly pressed against an annular area around the edge of opening 7, so that this opening will be normally closed. Valve 20 is vertically slidable on rod 8 and fits this rod closely to prevent leakage of water. The valve is preferably provided with a back disc 21 with hub and has attached soft bottom facing 22 of leather or rubber, to prevent leakage. Pin 23 on rod 8 normally lies below valve 20 and pin 31 on the same rod limits the upward movement of similar valve 24 which has a central hole so that it is slidable on rod 8, downward from pin 31. Valve 24 similarly has back disc 25 with hub and upper facing 26 of leather or rubber so that when rod 8 is pulled upward, the valve will close opening 27 in housing 28 which surrounds the valves. Housing 28 is soldered to bottom 6 as shown. Compression spring 30 is placed between the valves, and around rod 8, so that valve 24 will normally be pressed against pin 31 and valve 20 will normally be pressed downward against bottom 6. Pin 31 normally lies below the top of housing 28 so that water from tank 1 will flow through opening 27 to fill this housing. Air will escape through opening 27.

Now, when it is desired to use the device, a plant is dropped, roots first, into plant tube 2 so that the plant comes to rest between the shovels. The closed shovels are then pressed into soft earth and squeeze bar 12 is pulled upward toward handle 17, so that rod 8 will be pulled upward against the tension of spring 19 and valve 24 will quickly close opening 27. Further upward movement of rod 8 will cause pin 23 finally to strike valve 20 and to lift it from its seat so that the water in the housing 28 will be discharged through opening 7 whence it will flow to the roots of the plant, being directed by guide 29. While valve 20 is lifted off its seat valve 24 is pressed tightly over opening 27, inside housing 28, so that no more water enters, spring 30 being compressed in the meanwhile. The upward movement of rod 8 simultaneously causes pivoted shovel 4 to swing outward to open a space in the ground for the plant.

When squeeze bar 12 is released spring 19 pulls rod 8 downward so that valve 20 again closes opening 7 and further downward movement causes pin 31 to strike valve 24 and to press it downward as shown, against compression spring 30, so that housing 28 will again be filled with water. Therefore a definite quantity of water is discharged at each operation and the construction is of very simple design. Shovel 4 is of course again pressed against shovel 3 when rod 8 reaches its final downward position.

Any suitable devices such as wings on the shovels may be used for placing dirt around the plant. The shovels are withdrawn from the earth while in open position, as usual.

What I claim is:

1. In a planting device, a tank for liquid, a shovel fixed to the lower part of said device, a movable shovel pivoted to said fixed shovel, a plant tube fastened to said tank and leading into the space between said shovels, yielding means normally urging said pivoted shovel toward said fixed shovel, means to rotate said pivoted shovel away from said fixed shovel, a valve casing in the bottom of said tank consisting of a housing with a top opening and a bottom opening, a valve rod movable through said top opening and carrying a valve for said top opening and a valve for said bottom opening, said valves being placed within said housing so that when said valve rod is lifted, said top opening is closed and then said bottom opening is uncovered, and when said rod is lowered said bottom opening is covered and then said top opening is uncovered, a handle attached to said device, means placed near said handle for operating said valve rod, said valve rod being extended through said bottom opening and pivoted to said movable shovel.

2. A planting device comprising, a tank for liquid, a handle attached to said device, a pair of relatively movable shovels attached to the lower part of said device, means for moving one of said shovels, an opening in the bottom of said tank, a housing surrounding said opening, a valve opening in said housing, a valve rod movable through said housing opening; a valve for said housing opening carried by said rod, a valve for said tank opening carried by said rod, said valves being arranged on said rod so that said housing will be alternately filled with said liquid and then emptied as said valve rod is operated, and said valve rod being pivotally attached to the movable shovel so that said shovel will be moved as said valves are moved.

3. In a planting device, a tank for liquid, a shovel fixed to the lower part of said device, a movable shovel pivoted to said fixed shovel, a plant tube fastened to said tank and leading into the space between said shovels, yielding means normally urging said movable shovel toward said fixed shovel, a valve in the bottom of said tank, a handle attached to said device, a valve operating rod extending downwardly from adjacent said handle, said rod being attached to said valve and pivoted to said movable shovel, said rod passing through an opening in said movable shovel, and the end of said rod adjacent said handle being adapted to be moved manually to operate said valve and said movable shovel.

ALBERT G. THOMAS.